US007120127B2

(12) United States Patent
Fieremans

(10) Patent No.: US 7,120,127 B2
(45) Date of Patent: Oct. 10, 2006

(54) METHOD FOR ASCERTAINING AND VISUALIZING NETWORK TOPOLOGIES

(75) Inventor: Geert Fieremans, Boca Raton, FL (US)

(73) Assignee: Siemens Aktiengesellschaft, Munich (DE)

(*) Notice: Subject to any disclaimer, the term of this patent is extended or adjusted under 35 U.S.C. 154(b) by 896 days.

(21) Appl. No.: 09/955,247

(22) Filed: Sep. 17, 2001

(65) Prior Publication Data
US 2002/0048263 A1 Apr. 25, 2002

(30) Foreign Application Priority Data
Sep. 19, 2000 (DE) ................ 100 46 312

(51) Int. Cl.
H04L 12/28 (2006.01)
(52) U.S. Cl. .............. 370/254; 370/389; 709/220
(58) Field of Classification Search ........ 370/254–258; 709/220–222
See application file for complete search history.

(56) References Cited

U.S. PATENT DOCUMENTS

| 5,485,578 A | | 1/1996 | Sweazey | |
| 5,732,086 A | * | 3/1998 | Liang et al. | 370/410 |
| 6,347,079 B1 | * | 2/2002 | Stephens et al. | 370/255 |
| 6,456,599 B1 | * | 9/2002 | Elliott | 370/254 |
| 6,667,960 B1 | * | 12/2003 | Snyder et al. | 370/255 |
| 6,791,948 B1 | * | 9/2004 | Desnoyers et al. | 370/254 |

FOREIGN PATENT DOCUMENTS

| DE | 3613773 C2 | 10/1986 |
| DE | 692 25 637 T2 | 5/1998 |
| DE | 100 37 969 | 2/2002 |
| DE | 100 46 312 | 4/2002 |
| EP | 0 511 851 | 11/1992 |
| EP | 0 715 266 A2 | 6/1996 |

OTHER PUBLICATIONS

XP-000150599—Hohberg, "How to Find Biconnected Components in Distributed Networks", pp. 374-386.

* cited by examiner

Primary Examiner—Chau Nguyen
Assistant Examiner—Rhonda Murphy
(74) Attorney, Agent, or Firm—Bell, Boyd & Lloyd LLC

(57) ABSTRACT

A method to ascertain a network topology, wherein a request message is transmitted from a first network node to at least one second network node connected to the first network node, a second network node enters its associated node number in the network into the request message and forwards the request message to at least one third network node connected to the second network node, the request message is forwarded until all the network nodes arranged in the network and all connecting lines connecting the network nodes have been passed through, the request message is transmitted back to the first network node, and the network topology information, available in the form of the node numbers entered in the request message, is stored.

9 Claims, 5 Drawing Sheets

Fig 3

NODE-ID: 1,(2),3,4,1,4,2,4,3,5,6,7,8,3,8,7,5,7,6,9,9,6,5,3,2,1

| From \ To | 1 | 2 | 3 | 4 | 5 | 6 | 7 | 8 | 9 |
|---|---|---|---|---|---|---|---|---|---|
| 1 |   | (1,2) | | (1,4) | | | | | |
| 2 | (2,1) | | (2,3) | (2,4) | | | | | |
| 3 | | (3,2) | | (3,4) | (3,5) | | | (3,8) | |
| 4 | (4,1) | (4,2) | (4,3) | | | | | | |
| 5 | | | (5,3) | | | (5,6) | (5,7) | | |
| 6 | | | | | (6,5) | | (6,7) | | (6,9) |
| 7 | | | | | (7,5) | (7,6) | | (7,8) | |
| 8 | | | (8,3) | | | | (8,7) | | |
| 9 | | | | | | (9,6) | | | |

METHOD FOR ASCERTAINING AND VISUALIZING NETWORK TOPOLOGIES

BACKGROUND OF THE INVENTION

Communication networks and computer networks include network nodes, for example formed by communications installations and data processing devices, as well as the connecting lines connecting the individual network nodes to one another. In this context, a multiplicity of different network structures (also referred to in the literature as network topologies) are known, such as a star network, a ring network, a tree network, a chain network or a bus network.

In networks, a distinction is drawn between connectionless and connection-oriented networks, according to the topology of the respective network. Connectionless networks omit a signaling phase which precedes information transmission between communication terminals associated with the networks and within the context of which a connection is set up between the communication terminals. In a connectionless network, for example, an IP-oriented (Internet Protocol) computer network, an information packet to be transmitted is transmitted to each communication terminal associated with the network. The decision regarding which communication terminal processes the received information packet further or rejects it is made by the recipient of the information packet.

In a connection-oriented network, for example an ISDN-oriented communication network, in which information is transmitted from network node to network node via a connection set up previously within the context of a signaling connection, an important feature for optimum transmission of a message via the network is for the network topology to be known; i.e., for information to be held about how the individual network nodes are connected to one another.

The present invention is therefore directed toward providing methods which permit network topologies to be ascertained and visualized, particularly for a connection-oriented network.

SUMMARY OF THE INVENTION

Accordingly, in an embodiment of the present invention, a method is provided for ascertaining network topologies, wherein: a request for messages is transmitted from a first network node to at least one second network node connected to the first network node; the second network node enters its associated node number in the network into the request message and forwards the request message to at least one third network node connected to the second network node; the request message is forwarded until all the network nodes arranged in the network and all connecting lines connecting the network nodes have been passed through; and the request message is transmitted back to the first network node and the network topology information, available in the form of node numbers entered in the request message, is stored.

In an embodiment, in cases in which the node number of the third network node has already been entered in the request message, the third network node enters its node number into the request message again and sends the request message back to the second network node.

In an embodiment, the second network node likewise enters its node number into the request message again and forwards the request message to a further third network node.

In an embodiment, in cases in which the second network node has no connecting lines to further third network nodes, the second network node transmits the request message back to the first network node.

In an embodiment, the request message is transmitted via a signaling connection within the network.

In an embodiment, the information about the network topology is stored in tabular form, with two node numbers entered in succession in the request message being respectively converted into an entry of the table.

In an embodiment, the table is stored in a central data processing device connected to the first network node.

In a further embodiment of the present invention, a method is provided for visualizing the network topology, wherein: a network topology in the form of a tree structure is developed from a table which represents the network topology and includes information about network nodes and connecting lines of the network; the tree structure is used to ascertain whether the network topology includes an annular network and, if this the case, the network topology is developed from that annular network which includes the greatest number of network nodes; and, in cases in which the network topology does not include an annular network, a network topology in the form of a chain-like network is developed.

In an embodiment, to develop the tree structure, starting from a first network node as the root of the tree structure, second network nodes for which there is an entry available in the table's row associated with the first network node, are arranged in a next hierarchical level of the tree structure, and then connections from the first network node to the second network nodes are inserted, and starting from one of the second network nodes, third network nodes for which there is an entry available in the table's row associated with the second network node are arranged in a further next hierarchical level of the tree structure, ignoring those columns which are associated with the network node which has already been taken into account, and then connections from the second network node to the first and third network nodes are inserted, and the method is then continued until all the rows in the table have been processed.

In an embodiment, to ascertain whether the network topology includes an annular network, a bi-directional path which has the most network nodes within the tree structure is ascertained.

A fundamental advantage of this inventive method is that the network topology of a network can be automatically ascertained from any desired network node, and hence optimum transmission of messages (for example within the context of "Least Cost Routing") is made possible in a simple and convenient manner from this network node.

One advantage of refinements of the present invention is, among other things, that transmitting a request message in order to ascertain the network topology via a signaling connection, in particular a D-channel of an ISDN-oriented connection, within the network (frequently referred to in the literature as "Temporary Signaling Connection", TSC for short) takes up only a small amount of transmission capacity within the network, and no charges for ascertaining the network topology arise either.

Additional features and advantages of the present invention are described in, and will be apparent from, the following Detailed Description of the Invention and the Figures.

BRIEF DESCRIPTION OF THE FIGURES

FIG. 3 shows a table which represents the network topology of the network and includes information about network nodes and connecting lines in the network.

DETAILED DESCRIPTION OF THE INVENTION

Figure 1:
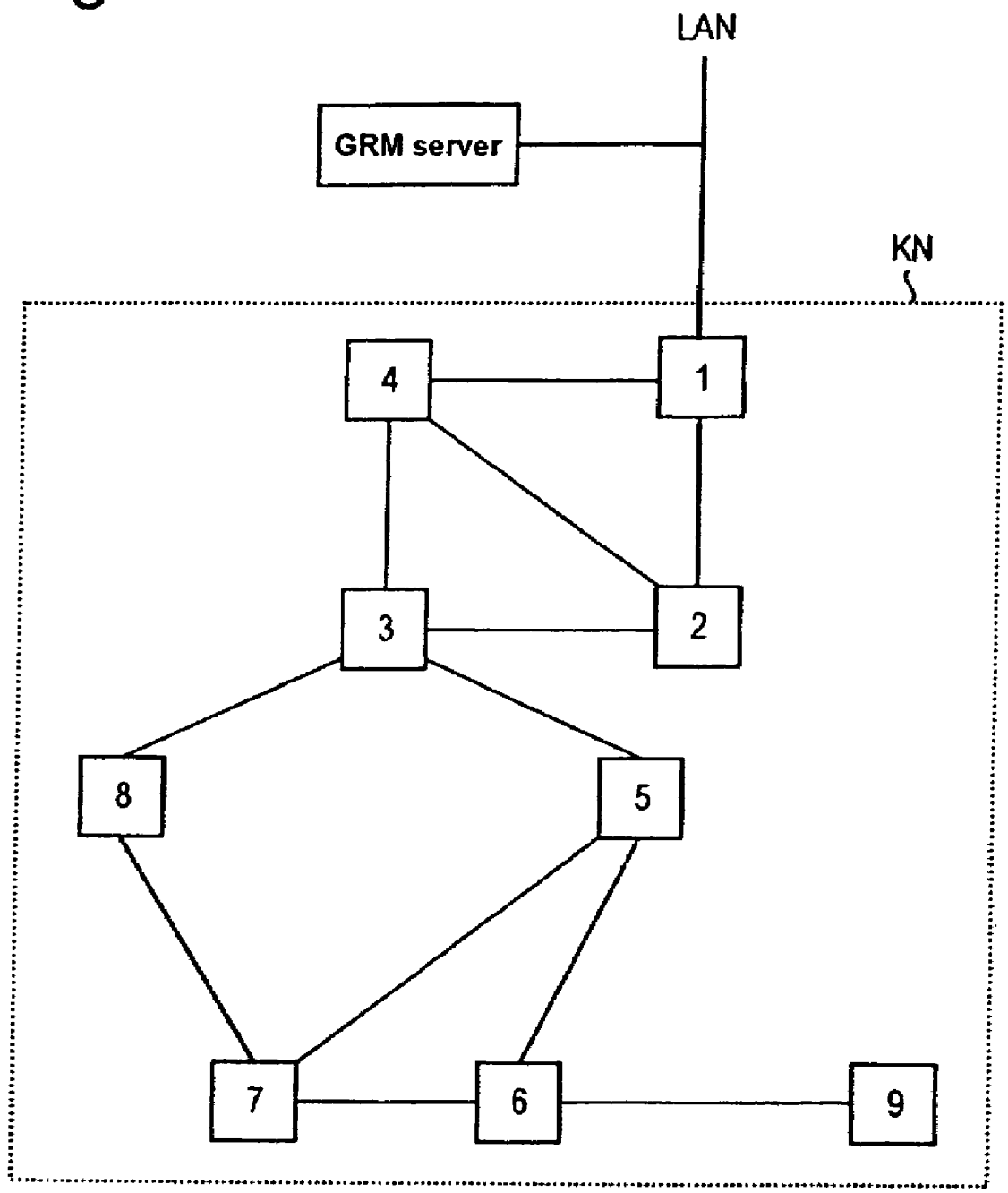
FIG. 1 shows a structogram for schematically illustrating an exemplary network.

FIG. 1 shows a structogram for an exemplary network KN, in particular a connection-oriented network, which is used to illustrate the inventive method below. In this case, the network KN is an ISDN-oriented communication network, for example. The network KN includes a total of nine network nodes 1, . . . ,9, which are interconnected with one another in the manner shown. In this case, the network KN has a series of annular and chain-like network structures. A network node can be produced, by way of example, by a communications installation or, alternatively, by an appropriately designed data processing device; e.g., a personal computer or a workstation.

The network KN is connected to a local area network LAN via a first network node 1. In this context, data are transmitted via the local area network LAN on the basis of the IP protocol (Internet Protocol). Connected to the local area network LAN is a "GRM server" (Global Routing Manager) which, in the present exemplary embodiment, is used for central administration of node numbers NODE-ID for the network nodes 1, . . . ,9 in the network KN. The node numbers NODE-ID can be used as a simple way for the individual network nodes 1, . . . ,9 to address one another. To be able to ensure unique addressing within the network KN, it is necessary for the respective node numbers NODE-ID to be unique.

Administration of the node numbers NODE-ID associated with the network nodes 1, . . . ,9 in the network KN requires that the GRM server receive information about which network nodes 1, . . . ,9 within the network KN are active; i.e., are registered on the network KN. For communication with the GRM server, the first network node 1, therefore, has a communication unit (not shown), frequently referred to in the literature as GRM client, which is used for transmitting the required information to the GRM server.

Figure 2A:
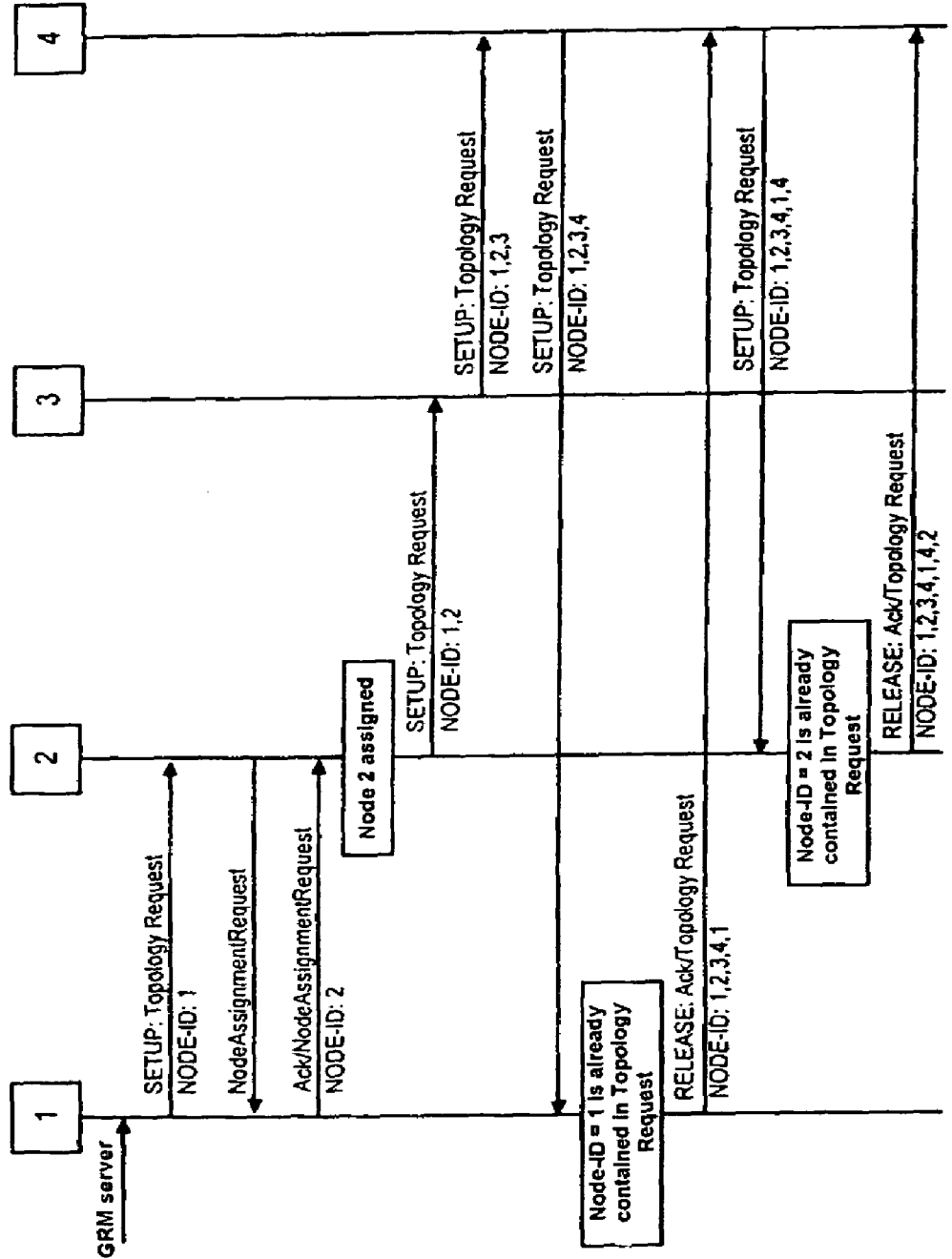
FIG. 2a shows a first flowchart to illustrate the fundamental method steps of the present invention carried out for ascertaining the network topology.
Figure 2B:
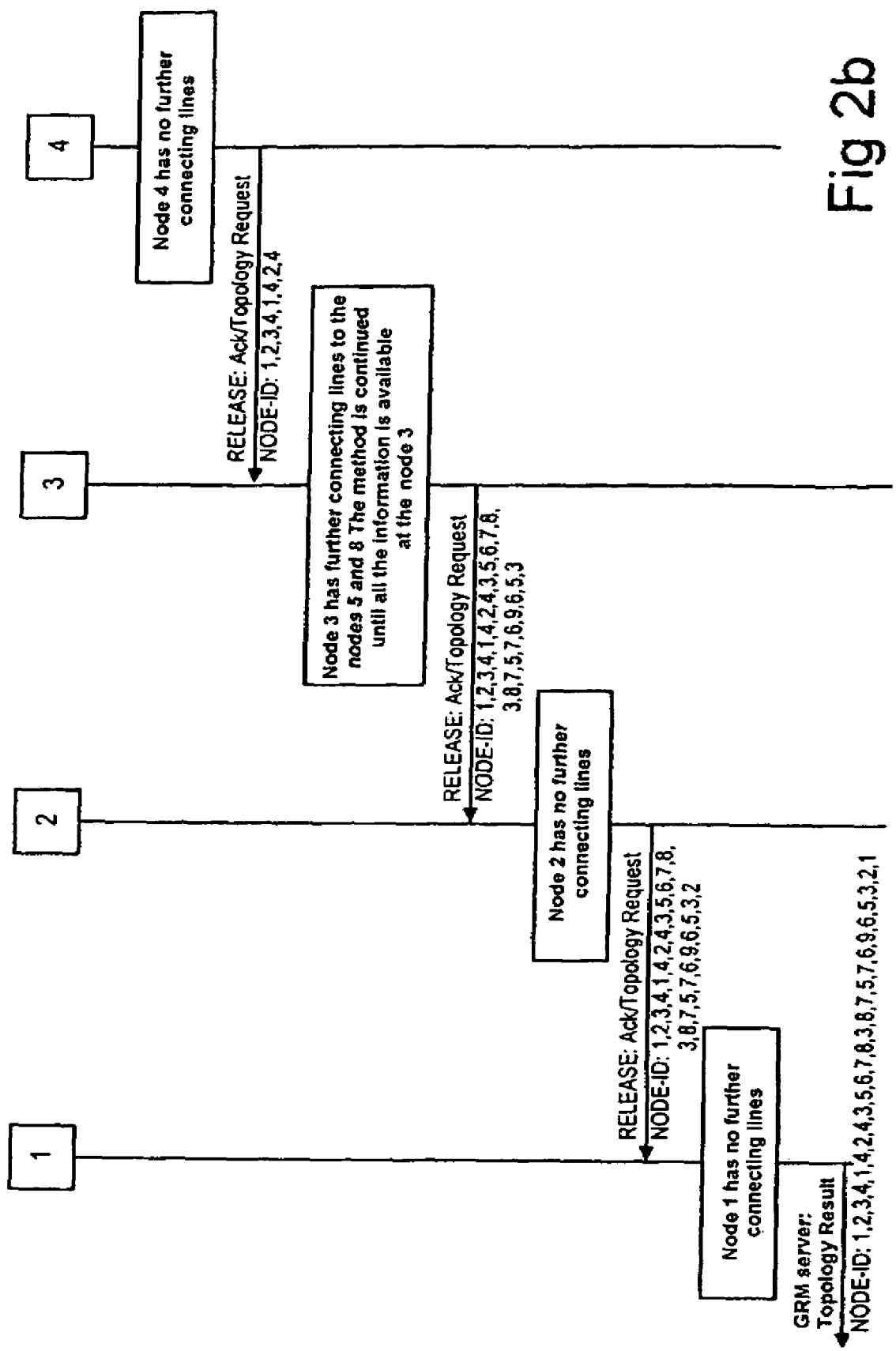
FIG. 2b shows a second flowchart to illustrate the fundamental method steps of the present invention carried out for ascertaining the network topology.

FIG. 2 (including both FIG. 2a and FIG. 2b) with FIG. 2b directly following FIG. 2a, shows a flowchart to illustrate the fundamental method steps carried out within the context of the inventive method for ascertaining the network nodes 1, . . . ,9 which are active or registered on the network KN. In the present exemplary embodiment, only the first four network nodes 1, . . . ,4 in the network KN are shown. In addition, it is assumed that the network nodes 1,3, . . . ,9 in the network KN have already been assigned a node number NODE-ID, with the exception of the second network node 2.

To ascertain the network topology from the GRM server, the GRM server sends a request message via the local area network LAN to the first network node 1 or to the communication unit (not shown) of the first network node 1. The first network node 1 or the communication unit (not shown) of the first network node 1 converts the request message from the IP protocol into the ISDN protocol, for example, and sends a message "SETUP: Topology Request, NODE-ID: 1" to one of the network nodes 2, 4 connected to the first network node 1; in the present exemplary embodiment, to the second network node 2. Since the second network node 2 in the network KN has not yet been assigned a node number NODE-ID, it sends a message "NodeAssignmentRequest" to the first network node 1. The first network node 1 then ascertains, by accessing the GRM server, a free node number NODE-ID (in the present exemplary embodiment, the node number NODE-ID=2) and sends an appropriate response message "Ack/NodeAssignmentRequest NODE-ID: 2" to the second network node 2. The second network node 2, thus, has been assigned the node number NODE-ID=2.

In a next step, the second network node 2 enters its node number NODE-ID=2 into the request message and sends a message "SETUP: Topology Request, NODE-ID: 1,2" to one of the network nodes 3,4 connected to the second network node 2 (in the present exemplary embodiment, to the third network node 3). This network node enters its node number NODE-ID=3 into the request message and sends a message "SETUP: Topology Request, NODE-ID: 1,2,3" to one of the network nodes 4,5,8 connected to the third network node 3 (in the present exemplary embodiment, to the fourth network node 4). The fourth network node 4, in turn, enters its node number NODE-ID=4 into the request message and sends a message "SETUP: Topology Request, NODE-ID: 1,2,3,4" to one of the network nodes 1,2 connected to the fourth network node 4 (in the present exemplary embodiment, to the first network node 1).

The first network node 1 recognizes that its node number NODE-ID=1 has already been entered in the request message. The first network node 1 then enters its node number NODE-ID=1 into the request message again and sends a message "RELEASE: Ack/Topology Request, NODE-ID: 1,2,3,4,1" back to the fourth network node 4. This network node enters its node number NODE-ID=4 into the request message again and sends a message "SETUP: Topology Request, NODE-ID: 1,2,3,4,1,4" to the network node 2 not selected previously. The second network node 2 likewise recognizes that its node number NODE-ID=2 has already been entered in the request message and then enters its node number NODE-ID=2 into the request message and sends a message "RELEASE: Ack/Topology Request, NODE-ID: 1,2,3,4,1,4,2" back to the fourth network node 4.

The fourth network node 4, thus, has no further connecting lines. It enters its node number NODE-ID=4 into the request message again and sends a message "RELEASE: Ack/Topology Request, NODE-ID: 1,2,3,4,1,4,2,4" back to the third network node 3, from which it originally received the request message. Unlike the fourth network node 4, the third network node 3 has further connecting lines, not yet taken into account, to the network nodes 5 and 8 and continues the method with the method steps described. In this context, the method is continued until all the information about the sub-network including the network nodes 3,5,6,7,8,9 is available at the third network node 3.

The third network node thus has no further connecting lines. It then enters its node number NODE-ID=3 into the request message again and sends a message "RELEASE: Ack/Topology Request, NODE-ID: 1,2,3,4,1,4,2,4,3,5,6,7, 8,3,8,7,5, 7,6,9,6,5,3" back to the second network node 2, from which it originally received the request message. The second network node, thus, likewise has no further connecting lines not yet taken into account. It enters its node number NODE-ID=2 into the request message and sends a message "RELEASE: Ack/Topology Request, NODE-ID: 1,2,3,4,1, 4,2,4,3,5,6,7,8,3,8,7,5,7,6,9,6,5,3,2" back to the first network node 1, from which it originally received the request message. The first network node, thus, likewise has no further connecting lines not yet taken into account. It then enters its node number NODE-ID=1 into the request message and, finally, sends a message "GRM server: Topology Result, NODE-ID: 1,2,3,4,1,4,2, 4,3,5,6,7,8,3,8,7,5,7,6,9,6, 5,3,2,1" to the GRM server. The GRM server stores the network topology information, obtained via the request message, in an appropriate manner in tabular form.

The messages for the request message are transmitted via a signaling connection, frequently referred to in the literature as "Temporary Signaling Connection" (TSC for short) in the network KN, for example a D-channel of an ISDN connection. In this way, only a small amount of transmission capacities are used within the network KN, and no additional charges arise for ascertaining the network topology.

FIG. 3 now shows a table which represents the network topology of the network KN and includes information about the network nodes 1, . . . ,9 and the connecting lines in the network KN. The table has a respective row and column for each network node 1, . . . ,9 in the network KN, where a row contains the connecting lines leaving a respective network node 1, . . . ,9 and a column contains the connecting lines entering a respective network node 1, . . . ,9. By way of example, the first network node 1 is connected both to the second and to the fourth network node 2, 4 via a respective bidirectional connecting line.

The GRM server converts the information in the form of node numbers NODE-ID: 1,2,3,4,1,4,2,4,3,5,6,7,8,3,8,7,5,7, 6,9,6,5,3,2,1, contained in the request message, into the described tabular form. To this end, the first node combination 1,2 is read from the request message and a corresponding entry (1,2) is inserted in the first row and second column of the table. The next node combination 2,3, including the second node number NODE-ID=2 of the first node combination 1,2 and the next node number NODE-ID=3 contained in the request message, is then read from the request message and a corresponding entry (2,3) is inserted in the second row and third column of the table. This method is continued until all the node combinations contained in the request message have been processed.

Figure 4:
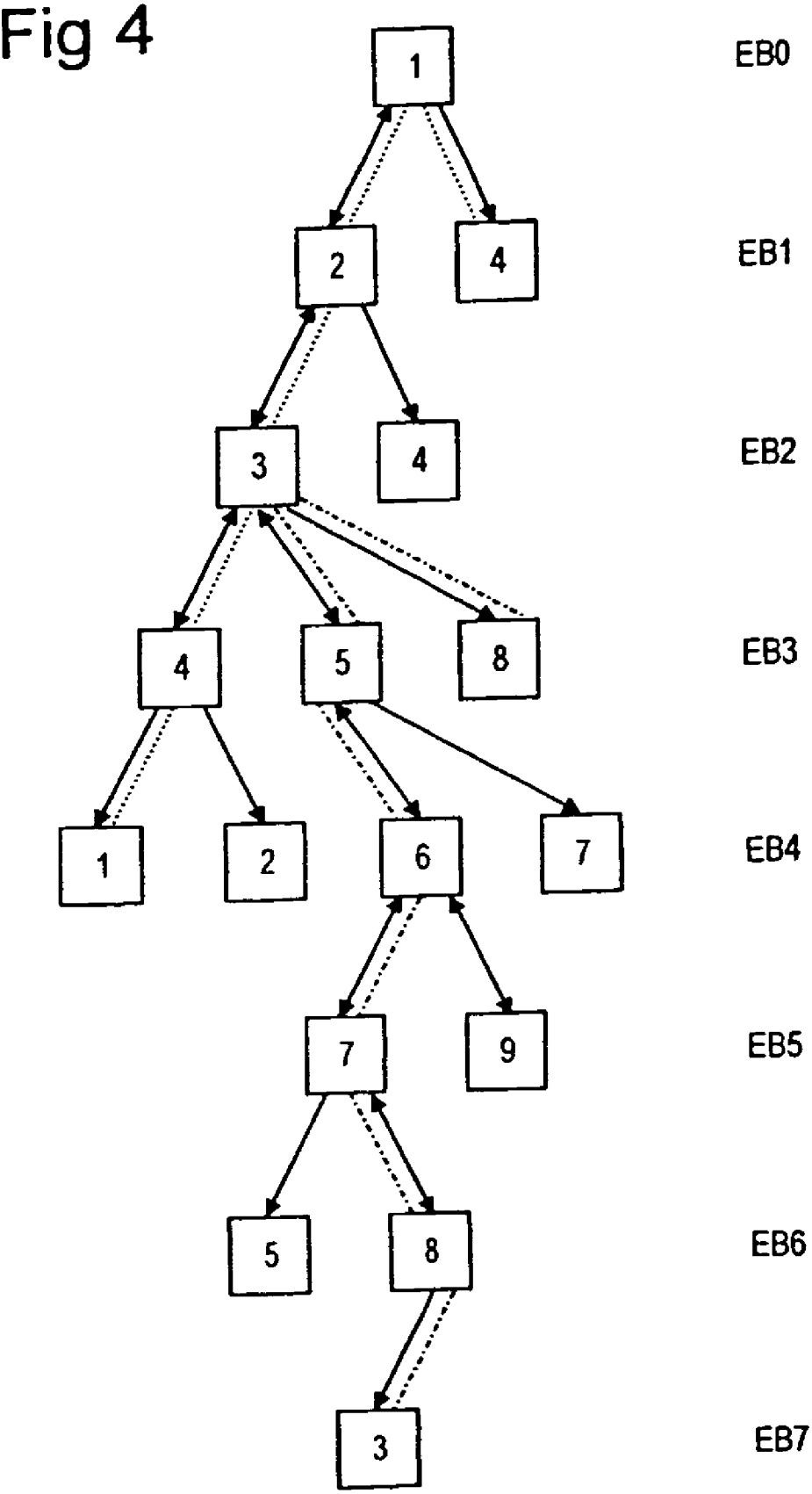
FIG. 4 shows a structogram to illustrate the network topology in the form of a tree structure.

FIG. 4 now shows a structogram to show the network topology in the form of a tree structure. To develop the tree structure from the table, any desired network node 1, . . . ,9 in the network KN is selected as the root EB0 of the tree structure. In the present exemplary embodiment, this is the first network node 1.

Starting from the first network node 1 as the root EB0 of the tree structure, those network nodes for which there is an entry available in the table's row associated with the first network node 1 are arranged in a first hierarchical level EB1 of the tree structure. In the present exemplary embodiment, these are the second and fourth network nodes 2,4. Next, the connections between the first network node 1 and the second and fourth network nodes 2,4 are inserted on the basis of the entries in the row associated with the first network node 1. In a next step, starting from one of the network nodes 2,4 of the first hierarchical level EB1 (in the present exemplary embodiment, from the second network node 2), those network nodes for which there is an entry available in the table's row associated with the second network node 2 are arranged in a second hierarchical level EB2 of the tree structure, ignoring those columns which are associated with a network node 1 which has already been taken into account. In the present exemplary embodiment, these are the third and fourth network nodes 3,4. Next, the connections between the second network node 2 and the first, third and fourth network nodes 3, 4 are inserted on the basis of the entries in the row associated with the second network node 2. The method described is continued until all the rows and columns in the table have been processed; i.e., in the present exemplary embodiment, up to a seventh hierarchical level EB7 of the tree structure.

To convert the network topology of the network KN from the tree structure into the real network structure, the tree structure is searched, starting from the root EB0, for ring structures; i.e., for bidirectional paths having the same starting and ending point. The present tree structure contains a number of ring structures. By way of example, a bidirectional path 1,2,3,4,1 is obtained starting from the root EB0 of the tree structure (illustrated by the dotted line in FIG. 4). In addition, a bidirectional path 3,5,6,7,8,3 is obtained starting from the second hierarchical level EB2 (illustrated by the dot-dashed line in FIG. 4).

To show the network topology, the network topology is shown graphically starting with the largest ring structure 3,5,6,7,8,3; i.e., with that bidirectional path which has the most network nodes. In a second step, the second ring structure 1,2,3,4,1 having the common third network node 3 is added. Finally, the connecting lines 2–4, 5–7 and 6–9 which are still missing are added. The method described is a simple way of obtaining the network topology shown in FIG. 1 for the network KN.

Although the present invention has been described with reference to specific embodiments, those with skill in the art will recognize that changes may be made thereto without departing from the spirit and scope of the invention as set forth in the hereafter appended claims.

The invention claimed is:

1. A method for ascertaining network topologies, the method comprising the steps of:
    transmitting a request message from a first network node to at least one second network node connected to the first network node;
    entering, via the second network node, an associated node number in the network into the request message;
    forwarding, via the second network node, the request message to at least one third network node connected to the second network node;
    forwarding the request message until all network nodes arranged in the network and all connecting lines connecting the network nodes have been passed through;
    transmitting the request message back to the first network node; and storing the network topology information available in the form of the node number entered in the request message;
    entering, via the third network node, an associated node number of the third network node into the request message again in cases in which the node number of the third network node already has been entered in the request message; and
    sending, via the third network node, the request message back to the second network node.

2. A method for ascertaining network topologies as claimed in claim 1, the method further comprising the steps of:
    entering, via the second network node, the node number of the second network node into the request message again; and forwarding, via the second network node, the request message to a further third network node.

3. A method for ascertaining network topologies as claimed in claim 2, the method further comprising the steps of:

transmitting, via the second network node, the request message back to the first network node in cases in which the second network node has no connecting lines to further third network nodes.

4. A method for ascertaining network topologies as claimed in claim 1, wherein the request message is transmitted via a signaling connection within the network.

5. A method for ascertaining network topologies as claimed in claim 1, wherein the information about the network topology is stored in tabular form, with two node numbers entered in succession in the request message being respectively converted into an entry of the table.

6. A method for ascertaining network topologies as claimed in claim 5, wherein the table is stored in a central data processing device connected to the first network node.

7. A method for ascertaining network topologies as claimed in claim 1, wherein the network topology in the form of a tree structure developed from a table which represents the network topology and including information about network nodes and connecting lines of the network, said method further comprising the steps of:

processing the tree structure to ascertain whether the network topology comprises an annular network;

developing the network topology from the annular network which comprises a greatest number of network nodes if the network topology comprises an annular network; and developing a network topology in the form of a chain-like network if the network topology does not comprise an annular network.

8. A method for ascertaining network topologies as claimed in claim 7, wherein, to develop the tree structure, the method further comprises:

starting from a first network node as a root of the tree structure, second network nodes for which there is an entry available in the table's row associated with the first network node are arranged in a next hierarchical level of the tree structure;

inserting connections from the first network node to the second network node, wherein, starting from one of the second network nodes, third network nodes for which there is an entry available in the table's row associated with the second network node are arranged in a further next hierarchical level of the tree structure;

ignoring those columns which are associated with a network node which already has been taken into account; and inserting connections from the second network node to the first and third network nodes, wherein the steps are respectively continued until all rows in the table have been processed.

9. A method for ascertaining network topologies as claimed in claim 7, wherein to ascertain whether the network topology comprises an annular network, a bi-directional path which has the most network nodes within the tree structure is ascertained.

* * * * *